United States Patent

[11] 3,604,805

[72] Inventor Gerald C. Scott
Ann Arbor, Mich.
[21] Appl. No. 839,346
[22] Filed July 7, 1969
[45] Patented Sept. 14, 1971
[73] Assignee Ford Motor Company
Dearborn, Mich.

[54] OPTICAL DETECTING AND RANGING SYSTEM FOR AUTOMOTIVE VEHICLES
8 Claims, 6 Drawing Figs.

[52] U.S. Cl. ............................................ 356/28, 356/5
[51] Int. Cl. .............................................. G01p 3/36
[50] Field of Search ............................................ 343/8; 356/5, 28

[56] References Cited
UNITED STATES PATENTS

| | | | |
|---|---|---|---|
| 2,970,310 | 1/1961 | Bruce | 356/5 X |
| 3,118,139 | 1/1964 | Durstewitz | 356/28 |
| 3,164,725 | 1/1965 | Straub | 356/5 |
| 3,517,998 | 6/1970 | Pryor | 356/28 |

*Primary Examiner*—Malcolm F. Hubler
*Attorneys*—John R. Faulkner and Keith L. Zerschling

ABSTRACT: A mechanical automatic gain control for a high-frequency detecting and ranging system of the short range type in which the axis of the transmitter is displaced relative to the axis of the receiver to linearize the strength of the received signal over the operating ranges of the system. The system may be used as a range or range rate finder in automotive vehicles in order to determine the distance or range and the range rate or relative velocity between a vehicle in which the system is located and the preceding vehicle. The transmitter transmits high-frequency electromagnetic energy, preferably in the infrared region, toward the rear of the preceding vehicle. This electromagnetic energy is reflected by the reflective lens systems found on the rear of conventional vehicles directionally back toward the transmitter. A small portion of this energy finds its way to the receiver which, as stated above, is displaced from the transmitter. It has been found that the strength or amplitude of the received signal does not vary inversely with the fourth power of the range, as is the case in conventional detecting and ranging systems, but may vary from values of 10 to 100.

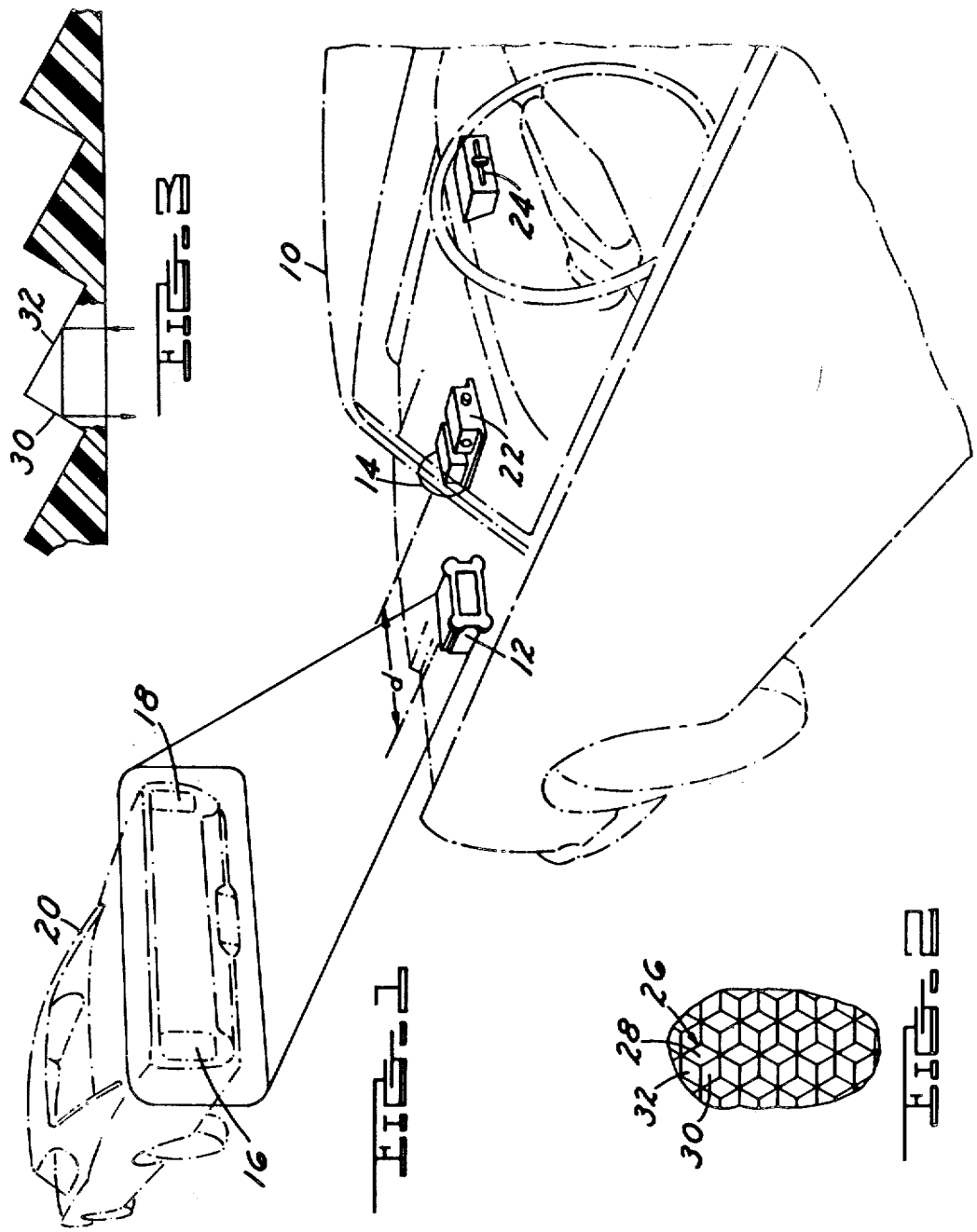

OPTICAL DETECTING AND RANGING SYSTEM FOR AUTOMOTIVE VEHICLES

BACKGROUND OF THE INVENTION

In conventional detecting and ranging systems, the received signal strength normally varies inversely as the fourth power of the range. In short range detecting and ranging systems, this presents a severe problem in properly handling these signals which may have a ratio of the maximum amplitude or signal strength at very short ranges to a minimum amplitude or signal strength at the longer ranges to a minimum amplitude or signal strength at the longer ranges of approximately $6\times10^8$. This ratio would apply where the detecting and ranging system is designed to operate in the range of 3 to 150 feet. Normally, sophisticated electrical circuits are used to limit this ratio to some acceptable value where it may be handled properly by electronic circuitry to compute both range and range rate.

In the present invention, this ratio of $6\times10^6$, for example, has been reduced in practice to values of 10 to 100 and ideally can be reduced to 1. This reduction is achieved by proper relative placement of the transmitter and the receiver and the use of high frequency signals, preferably in the infrared ranges.

SUMMARY OF THE INVENTION

When used as an automotive detecting and ranging system, the primary target for the detecting and ranging system of the present invention is the standard conventional retroreflector on the rear of a preceding vehicle which is designed to reflect light from the headlamps of the vehicle immediately behind it. These reflectors are of the optical corner cube type that very directionally reflect the light back to its source in a narrow beam.

If the receiver of this system were to be located on the transmitting axis of the transmitter, the amplitude or strength of the received signal would vary substantially inversely as the fourth power of the range. In the present invention, however, the receiver is located a predetermined distance from the transmitter, measured transversely with respect to the longitudinal axis of the vehicle, the direction of movement of the vehicle and the direction of the transmitted signal. As a result, the amplitude of the received signal will vary less strongly with range. It has been found that the variance of the strength of the received signal with range is strikingly linear when it is considered that if the transmitter and receiver were positioned on the same axis, the strength of the received signal would vary inversely as the fourth power of range. In automotive applications, the ranges of interest may be from 3 to 150 feet and if the ratio of the strength of the maximum signal received to the minimum signal received due to these different ranges, vary as the fourth power of the range, the ratio would be of the order of $6 \times 10^6$. In the present invention with the receiver axis displaced 6 inches from the transmitter axis, this ratio has been reduced to 100, and with the receiver axis displaced 10 inches from the transmitter axis, this ratio has been reduced to 10.

The automatic gain control feature of the present invention depends for its operation on the fact that the conventional reflectors found on automotive vehicles are of the optical corner cube type, or some similar type, that very directionally reflect light back to its source. In the conventional vehicle being produced today, these corner cube reflectors are comprised of a series of cubes having a dimension of approximately one-sixteenth of an inch or 1.6 millimeters. In order for the automatic gain control feature of the present invention to achieve the above-mentioned results of substantially linearizing the received signal with respect to range, the transmitted signal should have a wave length no longer than about one-sixteenth inch or about 1.6 millimeters. This translated into frequency amounts to approximately 0.5 kilomegacycles per second, and hence, is above the operating frequencies of conventional radio detecting and ranging systems. The frequency range over which the system of the present invention is operated is such that the wave length of the transmitted electromagnetic energy is in the optical region of the electromagnetic spectrum and in the range of from about 1.6 mm. to $4\times10^4$ mm. It is preferable to operate the detecting and ranging system so that it transmits infrared electromagnetic energy having a wave length encompassed within the range of wave lengths given above.

An object of the present invention is the provision of a mechanical automatic gain control system for a high frequency detecting and ranging system.

A further object of the invention is the provision of mechanical automatic gain control for a high frequency detecting and ranging system that may be used in automotive vehicles to determine very short ranges.

A further object of the invention is the provision of means in a high frequency detecting and ranging system for reducing the large ratios in the magnitude or strength of the received signals due to variations in the range from the system to the target.

Other objects and attendant advantages of the present invention may be more readily realized when the specification is considered in connection with the attached drawings.

BRIEF DESCRIPTION OF THE DRAWINGS

FIG. 1 is a schematic representation showing the transmitter and receiver of the detecting and ranging system of the present invention mounted in an automotive vehicle and transmitting electromagnetic energy toward a preceding vehicle;

FIG. 2 is a partial view of a conventional reflector positioned at the rear of an automotive vehicle;

FIG. 3 is a sectional view through the reflector shown in FIG. 2;

DESCRIPTION OF THE PREFERRED EMBODIMENT

Figure 4:
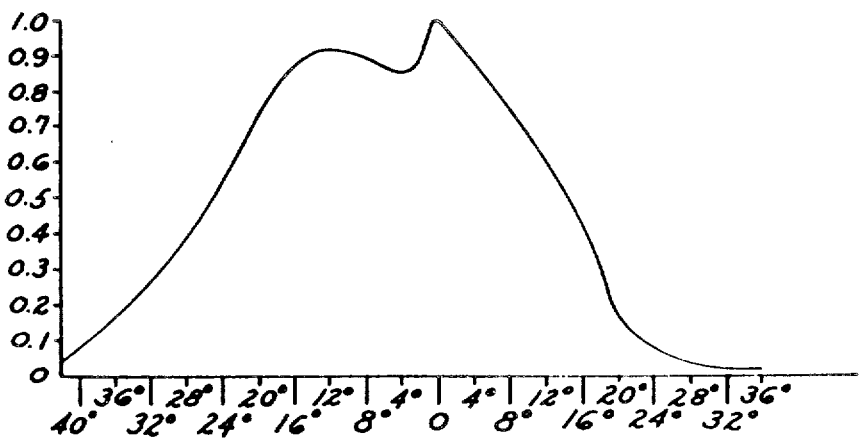
FIG. 4 is a plot showing the relative strengths of signals received from the reflector shown in FIGS. 2 and 3 as the reflector is rotated about either a central horizontal or a central vertical axis.

Referring now to the drawings in which like reference numerals designate like parts throughout the several views thereof, there is shown in FIG. 1 an automotive vehicle 10 having a transmitter 12 mounted therein for directing electromagnetic energy in a direction generally parallel to the longitudinal axis of the vehicle and to its direction of movement. A receiver 14 is also mounted in the vehicle 10 for receiving the reflected electromagnetic energy that is transmitted by the transmitter 10 and is reflected back toward the transmitter 12 from reflectors 16 and 18 mounted in the rear of a preceding vehicle 20. The receiver 14 has a computer 22 which will compute range and range rate between the vehicle 10 and the vehicle 20. This information may be used to control the speed of the vehicle through means not shown. The device 24 may be a speed selector for this means.

The reflectors 16 and 18 mounted in the preceding vehicle 20 are those conventionally used in automotive vehicles to reflect light from the headlights of the vehicle immediately behind it, for examples, the headlights of vehicle 10. These conventional reflectors are of the retrodirective type, that is, reflectors which are constructed to reflect light impinging thereon from a distant source back in the general direction of this incident source irrespective, within limits, reflect electromagnetic angle of incidence frequency the impinging light. These reflectors are described and shown in greater detail in U.S. Pat. No. 2,205,638.

As shown in FIG. 2, the reflectors 16 and 18 comprise a plurality of optical corner cubes 26, each of which has three mutually perpendicular planes or surfaces 28, 30 and 32. As shown more particularly in FIG. 3, light rays entering the flat surface of these reflectors, which faces toward the rear of the vehicle 20, will reflect light back in a direction parallel to the light incident thereon. They will also reflect electromagnetic energy having a frequency lower than, and hence a wave length longer than, the frequencies and wave lengths of the visible electromagnetic spectrum, provided these wave lengths do not exceed the dimensions of the lengths and widths of the plane surfaces 28, 30 and 32. In conventional automotive vehicle reflectors, these dimensions are approximately one-sixteenth inch on rear tail light lens reflectors. Consequently, the transmitter 12 should be designed to transmit electromagnetic energy having a wave length lower than one-sixteenth inch or approximately 1.6 millimeters.

The applicant prefers to operate the transmitter so that it transmits electromagnetic energy in the infrared region of the electromagnetic spectrum, for example, the wave length of the energy transmitted may be approximately 10,000 angstroms or 0.001 millimeters. This would correspond to a frequency of approximately $3 \times 10^{14}$ cycles per second. The infrared region of the electromagnetic spectrum is, of course, invisible to the human eye and therefor will not interfere with the ordinary function of the reflectors 16 and 18 on the vehicle 20 that is reflecting light from the headlamps of the vehicle immediately behind it.

The detecting and ranging system located in the vehicle 10 comprising the transmitter 12, the receiver 14, the computer 22 and the display device 24 may be of a conventional type which will transmit electromagnetic energy having the wave lengths and frequency ranges given above. Additionally, this detecting and ranging system may be of the type disclosed in my copending U.S. Pat. No. application Ser. No. 23,651, filed Mar. 30, 1970.

As stated previously, the reflectors 16 and 18 reflect light impinging thereon from a source back in the general direction of the source irrespective, within limits, of the angle of incidence of the impinging light.

Actual results of tests of this directivity of the reflection of the electromagnetic energy impinging upon the reflectors 16 and 18, with the elements rotated at different angles both horizontally and vertically about a central axis are shown in FIG. 4. In FIG. 4, the numeral 1 on the abscissa represents the strength of the light received back at the transmitter when the light impinging upon either reflector 16 or 18 is normal thereto. The curves on either side of this zero position indicate the ratio of the amount of light received when either reflector 16 or 18 is rotated through different angles to the left or to the right or upwardly or downwardly about a central vertical axis or central horizontal axis to the amount of light received when the light incident on either reflector is normal thereto.

Figure 6:
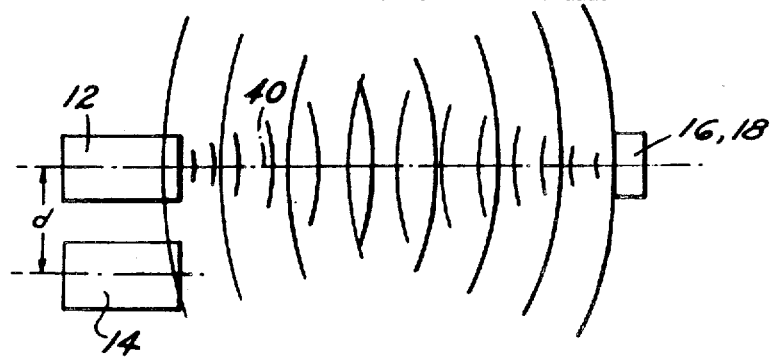
FIG. 6 is a schematic view showing the transmitter, the receiver and the reflector of the detecting and ranging system of the present invention together with a representation of the transmitted and reflected electromagnetic energy.

It can be appreciated by an inspection of FIGS. 1 and 6 that the axis of the transmitter 12 and the axis of the receiver 14 are displaced a distance "d" measured along a line which is substantially perpendicular to or transverse to the longitudinal axis of the vehicle 10 and to its direction of movement. It has been found that by displacing the axis of the receiver 14 from the axis of the transmitter 12, the strength or amplitude of the signal received by the receiver 14 over the operating range of the detecting and ranging system of the present invention may be substantially linearized.

Figure 5:
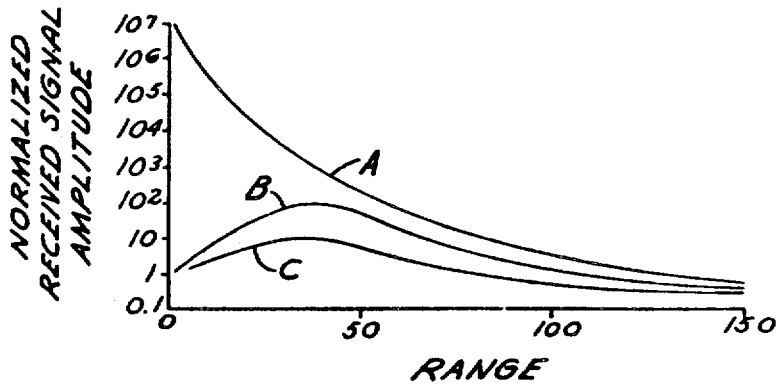
FIG. 5 is a series of curves showing the strength of the received signal as a function of range in a conventional radio detecting and ranging system and in the detecting and ranging system of the present invention.

Referring now to FIG. 5, there is shown a plot of the ratio of the amplitude or strength of a received signal at the receiver 14 to the amplitude or strength of a signal received when the vehicle 20 is at a maximum distance within the operating range of the detecting and ranging system from the vehicle 10. The first curve designated A is a plot of this ratio when the axis of the receiver 14 is coaxial with respect to the axis of the transmitter 12. This curve shows that this ratio varies substantially inversely as the fourth power of the range. On the other hand, if the distance "d" between the axes of the receiver 14 and the transmitter 12 is approximately 6 inches, this ratio, shown by the curve B, has a maximum value of approximately 100. This contrasts dramatically to the maximum value of the ratio shown in curve A (here the axes of the transmitter and receiver are coaxial) of approximately $6 \times 10^6$. The curve C shown in FIG. 5 shows a plot of this ratio when the axis of the receiver 14 is displaced from the axis of the transmitter 12 by a distance "d" equal to ten inches. In this case, the maximum value of this ratio is approximately 10. If the distance "d" is increased further, the maximum value of this ratio will decrease further and theoretically, could be reduced to a point where it is 1 throughout the range of operation of the detecting and ranging system.

FIG. 6 shows a schematic plan view of the receiver 14, the transmitter 12 and either of the reflectors 16 and 18. The transmitter transmits electrical energy along the axis or line 40 and it is designated by the wave action shown. The reflector, 16 or 18, reflects this electromagnetic energy back along the axis 40 with a certain angle of spread so that a small portion of the electromagnetic energy is received by the receiver 14. This spread is caused by the fact that in the mass production of the reflectors 16 and 18, the surfaces 28, 30 and 32 are not located at precisely right angles, and therefor, the reflected electromagnetic energy is not truly directive, but is spread somewhat so that the receiver 14 may pick a portion of this reflected electromagnetic energy. By separating the axis of receiver 14 from the axis of the transmitter 12 in a direction substantially transverse to the longitudinal axis of the vehicle, to the direction of movement of the vehicle and to the direction of propagation of the electromagnetic energy from the transmitter 12, the signal received by the receiver 14 is substantially linearized in accordance with the curves B and C of FIG. 5.

The present invention therefor provides a reliable uncomplicated mechanical automatic gain control for a high frequency detecting and ranging system. This mechanical automatic gain control thereby reduces the variations in the magnitude or strength of the signal received at the receiver of the system due to variations in range to a target. Consequently, the sophisticated electrical circuitry, which is usually and normally employed to overcome the problems associated with handling wide variations in the amplitude or strength of received signals, is eliminated.

I claim:

1. A high frequency detecting and ranging system for use in an automotive vehicle, comprising a transmitter and a receiver, said transmitter mounted on said automotive vehicle in a position to direct electromagnetic energy having a wave length in the optical region of the electromagnetic spectrum in the direction of forward movement of the vehicle and onto a target comprised of a pair of spaced optical retroreflectors of a preceding vehicle, said receiver being mounted on said automotive vehicle and separated from said transmitter so that the receiver is displaced from the transmitting axis of said transmitter by a predetermined distance whereby said receiver receives electromagnetic energy having a limited ratio in strength as the range between the system and the target changes.

2. The combination of claim 1 in which said predetermined distance is measured in a direction transverse to the longitudinal axis of said automotive vehicle.

3. The combination of claim 2 in which said transmitter and receiver are located in a plane substantially transverse to said longitudinal axis and the direction of movement of said vehicle.

4. In an automotive detecting and ranging system, an automotive vehicle, a transmitting means mounted on said automotive vehicle for directing electromagnetic radiation having a wave length between about 1.6 mm. and $4 \times 10^{14}$ mm. in a direction of forward movement of said automotive vehicle, a receiving means mounted on said automotive vehicle in a position displaced from the axis of said transmitting means, a target for receiving and reflecting the electromagnetic energy transmitted by said transmitting means, said target comprising the optical reflectors positioned on the rearwardly facing portion of a preceding automotive vehicle, said optical reflectors including means for directionally reflecting light back to said transmitter in a direction along the transmitting axis thereof whereby said receiving means receives electromagnetic energy having a limited ratio in strength as the range between the system and the target changes.

5. The combination of claim 4 in which the wavelength of the electromagnetic radiation falls in the nonvisible infrared region of the electromagnetic spectrum.

6. The combination of claim 4 in which the displacement of said receiving means from said transmitting means is measured in a direction transverse to the longitudinal axis of the automotive vehicle.

7. The combination of claim 5 in which the limited ratio in strength varies inversely as a function of the displacement of said receiving means from the axis of said transmitting means.

8. The combination of claim 7 in which the wave length of the electromagnetic radiation falls in the nonvisible infrared region of the electromagnetic spectrum.